(12) United States Patent
Colby et al.

(10) Patent No.: US 10,075,836 B2
(45) Date of Patent: Sep. 11, 2018

(54) GROUP MANAGEMENT OF DEVICES METHODS, APPARATUSES AND SYSTEMS

(71) Applicant: Intel Corporation, Santa Clara, CA (US)

(72) Inventors: Robert A. Colby, Granite Bay, CA (US); Assaf Mevorach, Portland, OR (US); Mats Agerstam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 14/747,746

(22) Filed: Jun. 23, 2015

(65) Prior Publication Data

US 2016/0381542 A1 Dec. 29, 2016

(51) Int. Cl.
| | |
|---|---|
| *H04W 8/00* | (2009.01) |
| *H04W 4/02* | (2018.01) |
| *H04W 4/80* | (2018.01) |
| *H04W 84/20* | (2009.01) |
| *H04W 84/12* | (2009.01) |
| *H04W 8/18* | (2009.01) |

(52) U.S. Cl.
CPC ............ *H04W 8/005* (2013.01); *H04W 4/02* (2013.01); *H04W 4/80* (2018.02); *H04W 8/186* (2013.01); *H04W 84/12* (2013.01); *H04W 84/20* (2013.01)

(58) Field of Classification Search
CPC .............................. H04W 4/008; H04W 84/20
See application file for complete search history.

(56) References Cited

U.S. PATENT DOCUMENTS

| | | | | |
|---|---|---|---|---|
| 2004/0111501 | A1* | 6/2004 | Lee | H04L 12/2803 709/222 |
| 2005/0262216 | A1* | 11/2005 | Kashiwabara | H04L 12/24 709/208 |
| 2007/0223398 | A1* | 9/2007 | Luo | H04W 4/08 370/254 |
| 2014/0244833 | A1* | 8/2014 | Sharma | H04L 67/16 709/224 |
| 2015/0120000 | A1* | 4/2015 | Coffey | H04L 12/2803 700/13 |
| 2016/0043962 | A1* | 2/2016 | Kim | H04W 4/008 709/224 |
| 2016/0165651 | A1* | 6/2016 | Pathuri | H04W 76/021 370/329 |

* cited by examiner

*Primary Examiner* — Jaime Holliday
(74) *Attorney, Agent, or Firm* — Schwabe, Williamson & Wyatt, P.C.

(57) ABSTRACT

Embodiments include apparatuses, methods, and systems including a wireless transceiver, a processor coupled to the wireless transceiver, and a group management module operated by the processor to control the wireless transceiver to receive information pertaining to services offered by a plurality of devices co-located with the apparatus at a location, transmit the received information pertaining to the services offered by the plurality of devices, and information pertaining to services offered by the apparatus; and detect a response to the transmission by a new device; and manage, as a master device, the received information pertaining to the services offered by the plurality of devices and the services offered by the apparatus to enable the new device to join and cooperate with the plurality of devices and the apparatus at the location. Other embodiments may also be described and claimed.

25 Claims, 6 Drawing Sheets

| Tiebreaker Values | |
|---|---|
| T1: UUID | 68245580-f66d-4e07-883d-17d6bdef42fc |
| T2: MAC | 00-1C-B3-09-85-15 |

| Characteristic | Characteristic Values | | Weight |
|---|---|---|---|
| | Presence | Absence | |
| c1: Battery Power | 0.0 | 1.0 | w1 = 0.3 |
| c2: Mobility | 0.7 | 0.3 | w2 = 0.1 |
| c3: AOAA | 0.3 | 0.7 | w3 = .01 |
| c4 CPU | 1.0 | 0.0 | w4 = 0.2 |
| c5: Memory | 1.0 | 0.0 | w5 = 0.1 |
| c6: Network | 1.0 | 0.0 | w6 = 0.2 |

GROUP MANAGEMENT OF DEVICES METHODS, APPARATUSES AND SYSTEMS

FIELD

Embodiments of the present invention relate generally to the technical field of wireless communication, and more particularly to group management of devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

As the Internet of Things ("IoT") continues to grow, more and more "things" may need to be managed. As "things" or devices embedded with electronics, software, sensors, and connectivity technology change location, users may need to spend time and expense to manually reconfigure each item to become usable in the new environment. Furthermore, wireless traffic from too many devices can cause delays in discovery times. Oftentimes, the more devices in a single location or space, the poorer the user experience for discovery may be.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Figure 1:
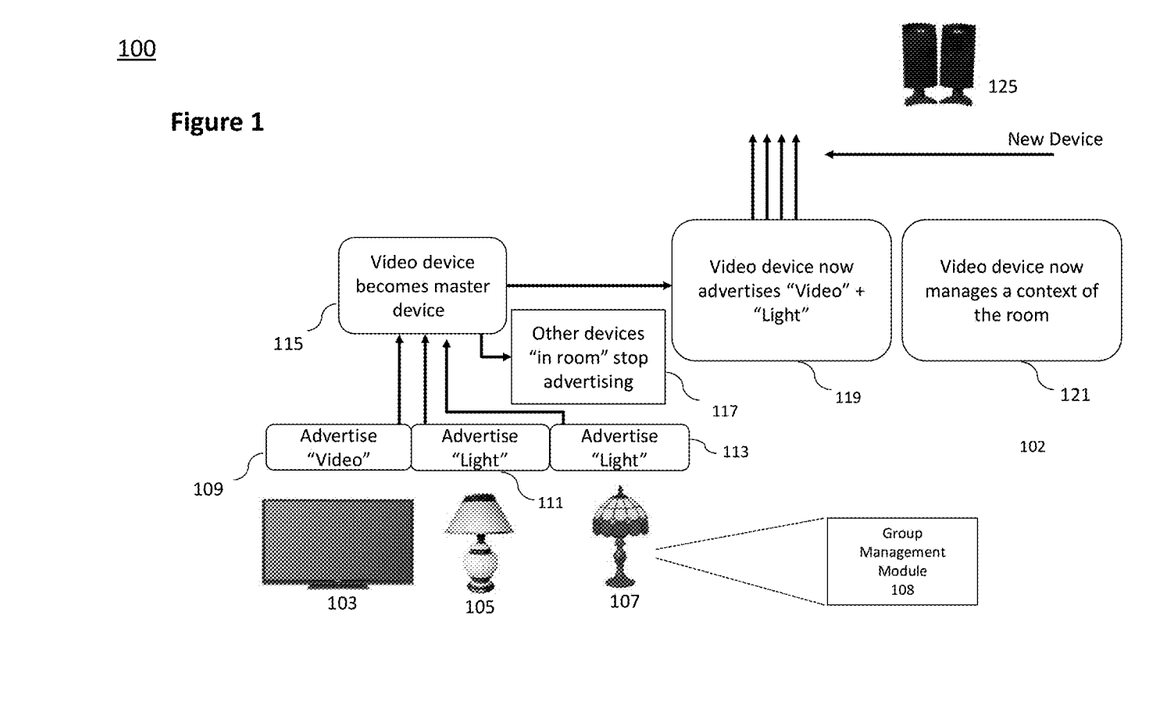
FIG. 1 illustrates an example flow diagram for group management of devices, in accordance with various embodiments.

FIG. 1 illustrates an example flow diagram 100 for managing a plurality of "things" or devices in a location, in accordance with various embodiments. In the diagram, the plurality of devices ("devices") are located proximally to each other, e.g., in a similar room or area. In the embodiment shown, the devices may include a television or video device 103, a first lamp or first lighting device 105, a second lamp or second lighting device 107, and a new audio device 125. In the embodiment, each of the devices may include a group management module, although for simplicity, only group management module 108 of second lighting device 107 is shown in the Figure. In embodiments, the group management module of each device may assist the device to wirelessly communicate or advertise information pertaining to a service provided by the device to the other devices. Note that in embodiments, the devices may utilize any suitable wireless technology and/or device recognition technology in connection with the wireless communications. In some embodiments, ultrasonics may be used. As will be discussed further below, in embodiments, the devices may include a wireless transceiver that may transmit and receive any type of suitable radio signal (e.g., WiFi radio signals, Blue-tooth radio signal, Blue-tooth Low-Energy radio signals, etc.).

Accordingly, in the embodiment, beginning in a lower left-corner at a block 109, video device 103 may advertise that it is a provider of video services or "Video" while at respective blocks 111 and 113, first lighting device 105 and second lighting device 107 may each advertise that they are providers of light service or "Light." After an initial period of the devices advertising their services, at a block 115, one of the devices, e.g., video device 103, may become a master device of the devices in the location. In embodiments, and as will be discussed in more detail below in connection with FIGS. 2 and 3, this determination may be made according to a feasibility score of video device 103 as compared to feasibility scores of respective first and second lighting devices 105 and 107. In embodiments, feasibility scores may include a measure of device characteristics as relevant to performance of a master device. In embodiments, upon receiving a message from video device 103 that video device 103 is the master device (or in other embodiments, determining by lighting devices 105 and 107 themselves that video device 103 is the master device), each of lamps 105 and 107 may stop advertising their respective services at a block 117. As shown at a block 119, the master device may now advertise services available in the location on behalf of the other devices. Thus, in addition to advertising its own service, video device 103 ("master video device 103") may advertise services of lighting devices 105 and 107.

Accordingly in embodiments, when new audio device 125 enters the location, rather than exchanging information with each device, it need only exchange information with master video device 103. Thus, new audio device 125 may provide information about its own services to master video device 103 and receive information about services available from other devices in the location from master video device 103. As a result, in embodiments, reduced wireless traffic may result in reduced radio congestion and noise, and thus a reduced discovery time for the devices. Note that in embodiments, when a new device enters a location, a current master device may determine whether it will remain the master device or if the new device is a more appropriate device to serve as master device. Thus, in the embodiment, master video device 103 may compare its own feasibility score with a feasibility score of new audio device 125. In embodiments, after exchanging information, if master video device 103 has a higher feasibility score than that of new audio device 125, master video device 103 may remain the master device. In the alternative, if new audio device 125 has a higher feasibility score than master video device 103, then in embodiments, new audio device 125 may replace master video device 103 as the new master device.

Continuing to refer to FIG. 1, in embodiments, master video device 103, may manage information received from a new device along with information from the other devices to join and cooperate with the other devices in accordance with a context of the location. In embodiments, this may allow the devices to self-adapt to the context of the location without requiring assistance of a user to configure the devices. In embodiments, the context of the location may include settings associated with desired properties of the location such as a particular level of light or sound. In embodiments, the master device may use information related to the context of the location and the services offered by the devices to determine settings for each of the plurality of devices. In embodiments, master video device 103 may provide settings for a particular volume level or other audio setting to new audio device 125. In one embodiment, if the context of the location calls for 1000 lumens, first and second lighting devices 105 and 107 may each provide 500 lumens. Accordingly, in an embodiment, when a new lighting device enters the location, master video device 103 may instruct the new lighting device to provide 333 lumens and lighting devices 105 and 107 to each reduce their light settings to approximately 333 lumens. Thus in embodiments, devices may adapt to a context of the location based upon an instruction received from the master device.

Note that light settings are only one example of settings associated with a context of a location. In various embodiments, settings may be associated with any suitable service provided by any mobile or stationary device including the group management module in the location.

Figure 2:
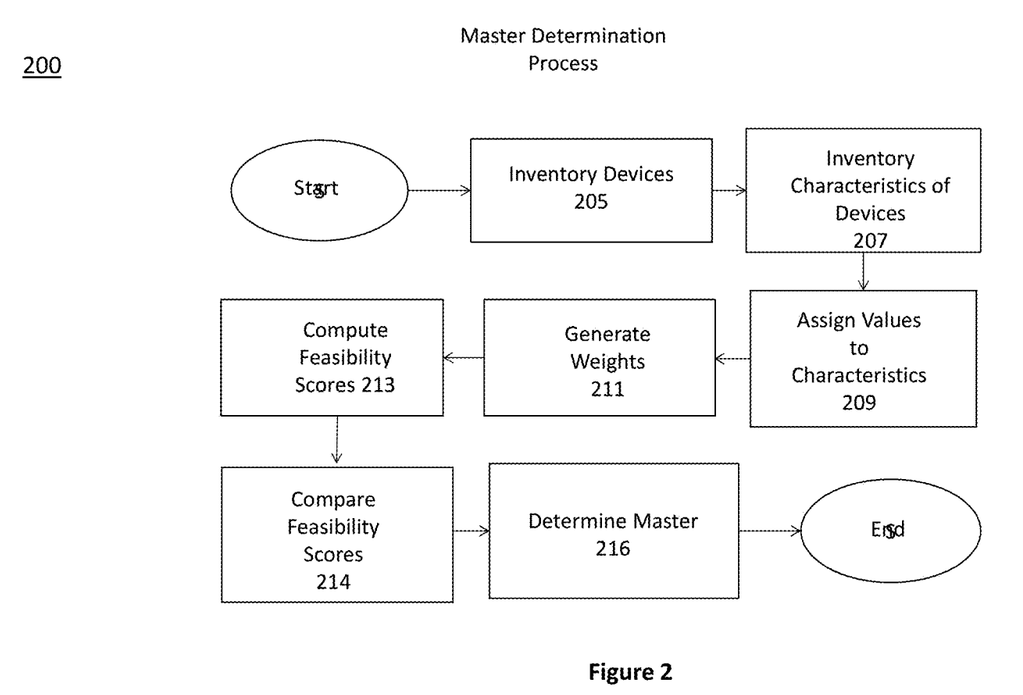
FIG. 2 illustrates an example flow diagram for master device determination, in accordance with various embodiments.

FIG. 2 is a flow diagram that illustrates a master determination process, according to various embodiments. As shown, for the embodiments, the master determination process includes a calculation of a feasibility score for determining which device is to be a master device among a plurality of devices ("devices"). In embodiments, feasibility scores may be measured according to one or more characteristics including a type of power source, mobility, availability, device system specification, or number and type of network interfaces. A group management module of the master device and/or of one or more devices may implement the process with assistance of suitable software or hardware in accordance with embodiments of the invention. Accordingly, in the embodiment, beginning at a block 205, the group management module may take an inventory of the devices in the location. Next, in the embodiment at a block 207, the group management module may take an inventory of characteristics associated with the devices. In embodiments, the characteristics may be those characteristics that may be relevant to performing a function of a master device and provided by a particular device in the location. In embodiments, the group management module may receive information about the characteristics by exchanging metadata with the other devices during an initial advertising stage, such as for example, associated with blocks 109, 111, and 113 of FIG. 1. According to embodiments, examples of such characteristics may include but are not limited to, whether a device runs on battery or AC power, whether the device is mobile or stationary, and whether the device is "always on/always available" ("AOAA") or moves frequently into hibernation, sleep, or other power-saving states. Other characteristics may include details about system specifications, such as related to, capabilities of a central processing unit (CPU) or memory, input/output "I/O" devices, and/or a number of homogeneous or heterogeneous network interfaces of the device.

In embodiments, once the inventory of characteristics has been taken, the group management module may assign values to the characteristics at a next block 209. To further illustrate, FIG. 3 includes an example table 300 illustrating example characteristics, e.g., $c_1$–$c_6$, in a column 303 with corresponding example assigned values for a presence of a characteristic in column 305 and an absence of the characteristic in a column 307, where $0 \leq c_n \leq 1$. Thus, for example, as can be seen in a row 309, a device characteristic, $c_1$, of a battery power source or "Battery Power" may be assigned a value of "0" while an "absence" of this characteristic (e.g., running on alternating current (AC) power) may be assigned a value of "1." In another example, across a row 311, mobility may be assigned a value of 0.7 and the absence of mobility (e.g., a stationary device) may be assigned a value of 0.3. Thus, for an example device that may be non-battery powered, non-mobile, non-AOAA, have an appropriate central processing unit (CPU), memory and network interface, example characteristic values of $c_1$-$c_6$ are shown in Table 300 in bold.

Figure 3:
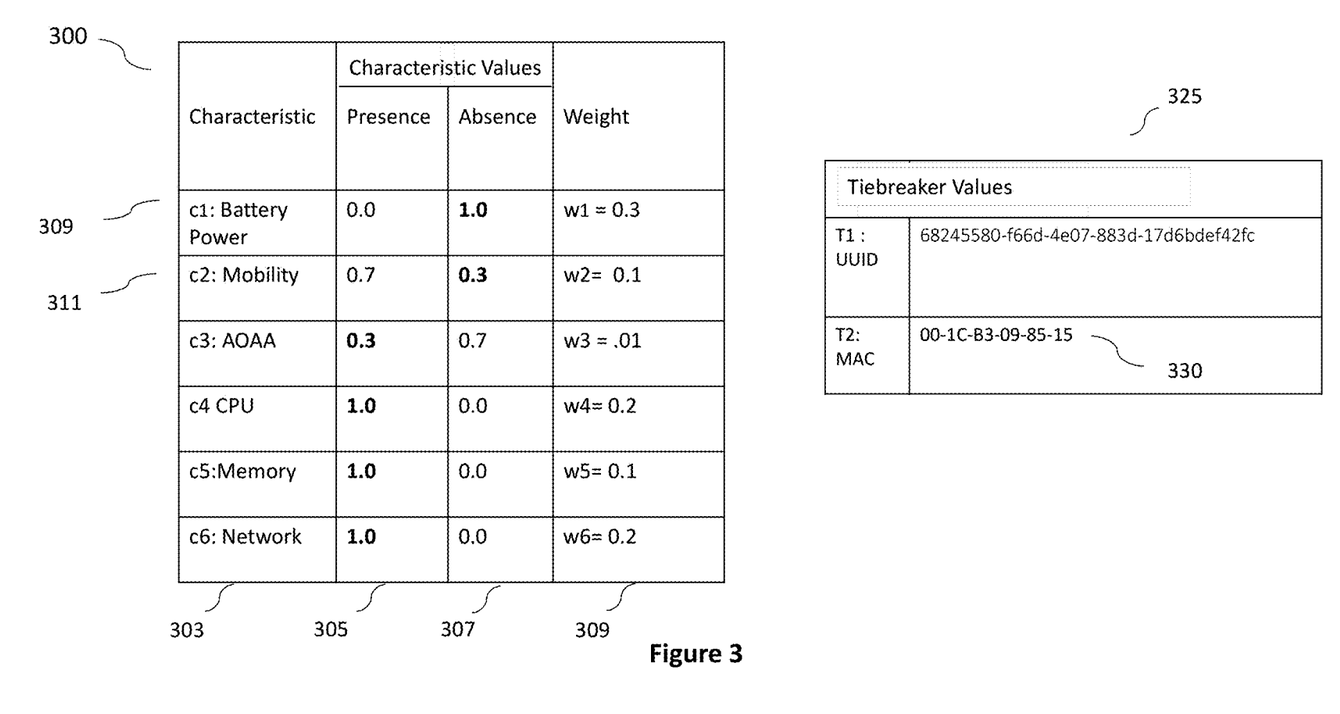
FIG. 3 illustrates example data tables associated with the flow diagram of FIG. 2 in accordance with various embodiments.

In the embodiment, at a next block 211, the group management module may generate weights corresponding to each characteristic according to how relevant the characteristic may be relative to the other characteristics associated with the devices in the location. In embodiments, weights, w1+w2+w3 . . . +wn (where n is the nth relevant characteristic associated with the devices in the room) may sum to a value of 1. In the embodiment, column 309 shows example generated weights, w1-w6, of example characteristics $c_1$-$c_6$. As illustrated, in the embodiment, characteristics such as battery power, CPU, and network interface ("Network") may have higher weights due to power consumption and performance concerns. In embodiments, it may be preferred for an AC powered device to take over as a master device if a current master device is running only on battery power. Note that table 300 includes only example data for illustrative purposes as characteristics and their relative weights may vary widely, e.g., according to a characteristics, criteria, context of a location, and/or devices in the location.

Once weights have been generated, the group management module may compute feasibility scores at a next block 213. In embodiments, if $F_d$ represents a feasibility score of device d:

$$F_d = (100 * \text{sum}(w_1 c_1 + w_2 c_2 + \ldots w_n c_n)), \text{ where sum} (w_1 + w_2 + \ldots w_n = 1)$$

Thus, for the present example, using the weights of column 309 and the characteristic values of columns 305 and 307, $$F_d = (100 * \text{sum } (w_1 c_1 + w_2 c_2 + \ldots w_6 c_6))$$

$$F_d = (100 * \text{sum } (0.3(1) + 0.1(0.3) + 0.1(0.3) + 0.2(1) + 0.1(1) + 0.2(1))) = 77$$

Accordingly, in embodiments, a feasibility score of the example device may be 77. At a next block 214, in the embodiment, the group management module may compare its feasibility score of 77 to received feasibility scores from the other devices in the plurality. In embodiments, the device with a higher feasibility score may be determined to be the master device at block 216. In embodiments, if two devices have the same feasibility score, various criteria can be used as a determining criteria. For example, in one embodiment, a device with a higher valued universally unique device identifier (UUID) may be used as determining criteria. If, for example, the UUID is not available, a media access control (MAC) address of a currently active network interface may be used, in an embodiment. In embodiments, a table 325 provides examples of values associated with the example device that may be used for a first tiebreaker T1 and a second tiebreaker T2, if needed. Note that in embodiments, when considering the MAC address for a second tiebreaker T2, as a first three octets may be an organizationally unique identifier of a vender of a network interface, in embodiments, it may be preferable to use a last three bytes that may be used to form a 24-bit number. Thus, in table 325, at a location 330, 09-85-15 may be used as a comparison value in embodiments. Note that the characteristics and weights of the example given here have been simplified for the sake of illustration and that various formulas for determining weights and values in accordance to the spirit of the invention may be implemented.

Figure 4:
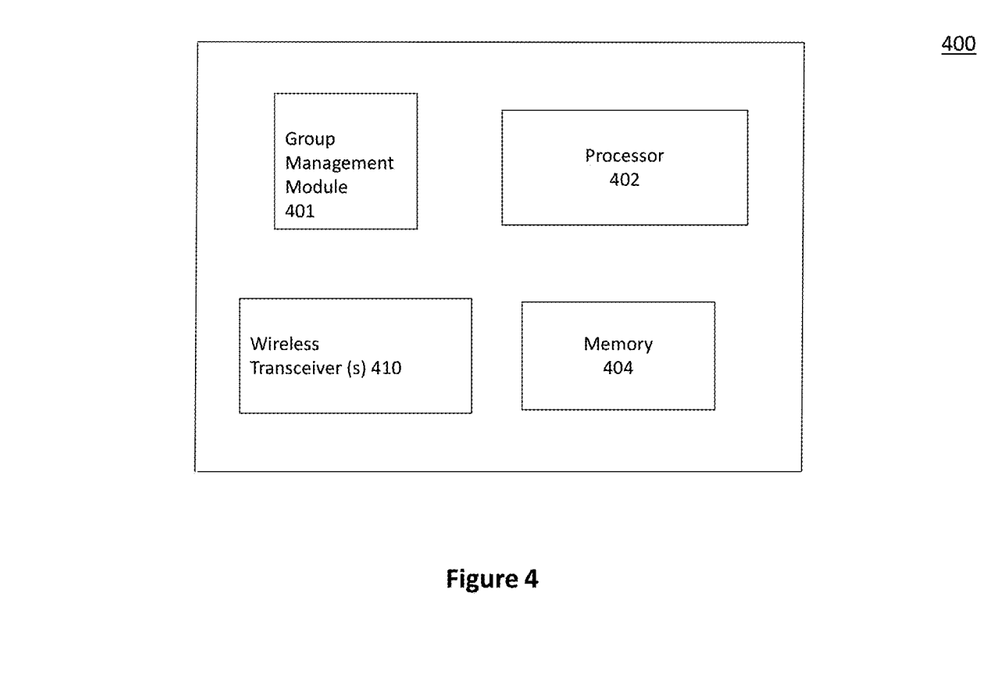
FIG. 4 illustrates an example device configured to employ the apparatuses and methods described herein, in accordance with various embodiments.

FIG. 4 illustrates an example device that may be suitable for use to practice selected aspects of the present disclosure. In embodiments, device 400 may include a memory 404, wireless transceiver 410, and a group management module 401, such as described in connection with FIGS. 1-3. In embodiments, group management module 401 may be operated by a processor 402. In embodiments, wireless transceiver 410 may include a receiver and a transmitter. In some embodiments, wireless transceiver 410 may include a bluetooth low energy transceiver. In embodiments, group management module 401 may control wireless transceiver 410 to receive information pertaining to services offered by a plurality of devices co-located with the device at a location, transmit the received information pertaining to the services offered by the plurality of devices, and information pertaining to services offered by the device; and detect a response to the transmission by a new device such as new audio device 125 of FIG. 1. In embodiments, a "new" device may be a device new to the location or newly activated in the location. In embodiments, device 400 including group management module 401 may manage, as a master device, the received information pertaining to the services offered by the plurality of devices and the services offered by the device to enable the new device to join and cooperate with the plurality of devices and the device at the location. Note that in embodiments, device 400 may be any suitable wireless communication device that may benefit from self-adaptation to a location including a plurality of devices. In embodiments, device 400 may include computing devices such as smartphones, tablets, laptops, desktop computers, servers, as well as home entertainment devices including audio devices, game consoles (Xbox, Playstation, etc.), as well as consumer wearables and appliances, including lighting devices such as those described in connection with FIG. 1.

Figure 5:
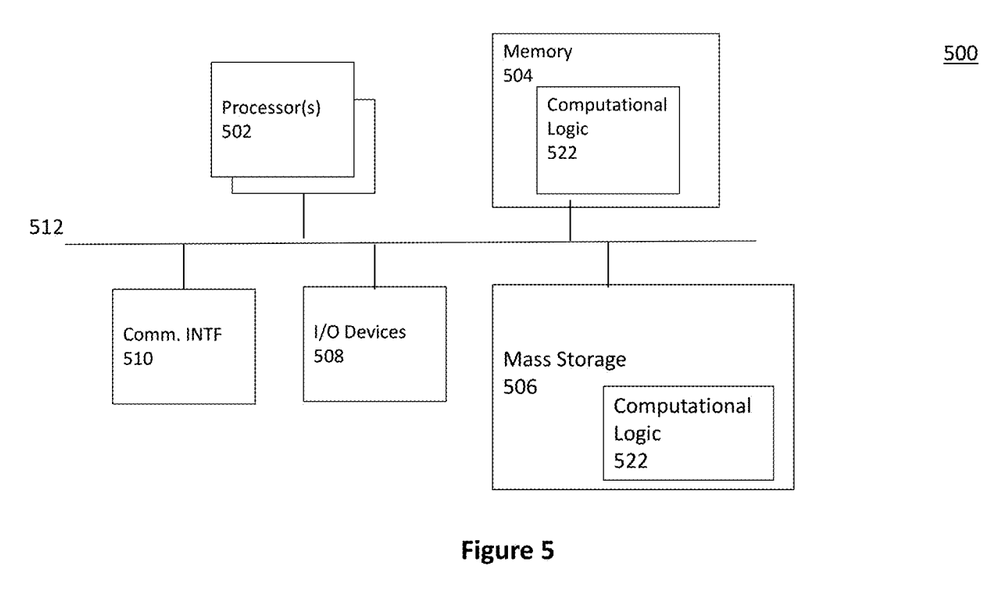
FIG. 5 illustrates an example computer system suitable for use to practice various aspects of the present disclosure, according to the disclosed embodiments.

FIG. 5 illustrates an example computer system that may be suitable as another device to practice selected aspects of the present disclosure. As shown, computer 500 may include one or more processors or processor cores 502, and system memory 504. For the purpose of this application, including the claims, the terms "processor" and "processor cores" may be considered synonymous, unless the context clearly requires otherwise. Additionally, computer 500 may include mass storage devices 506 (such as diskette, hard drive, compact disc read only memory (CD-ROM) and so forth), input/output devices 508 (such as display, keyboard, cursor control and so forth) and communication interfaces 510 (such as network interface cards that may include or be integrated with wireless transceiver 410, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions implementing the operations associated with a group management module as described in connection with FIGS. 1-4, and/or other functions, collectively referred to as computational logic 522. The various elements may be implemented by assembler instructions supported by processor(s) 502 or high-level languages, such as, for example, C, that can be compiled into such instructions.

The number, capability and/or capacity of these elements 506-510 may vary, depending on whether computer 500 is used as a mobile device, a stationary device or a server. When use as mobile device, the capability and/or capacity of these elements 506-510 may vary, depending on whether the mobile device is a wearable device, a smartphone, a computing tablet, an ultrabook or a laptop. Otherwise, the constitutions of elements 506-510 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system."

Figure 6:
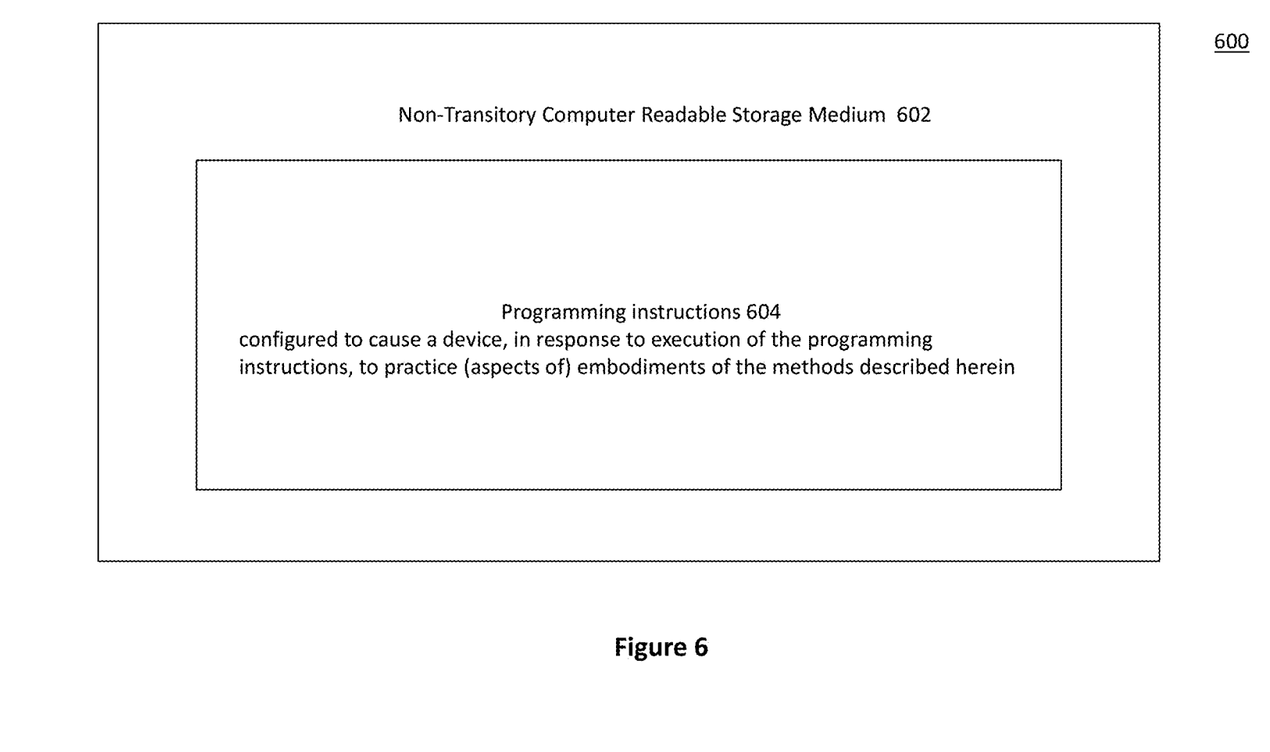
FIG. 6 illustrates a storage medium having instructions for practicing methods described with references to FIGS. 1-5 in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., device 400 or computer 500, in response to execution of the programming instructions, to perform, e.g., various operations associated with group management module 401. For example, device 400 may perform various operations such as to receive information pertaining to services offered by each of the other ones of a plurality of devices, advertise information pertaining to the services offered by each of the plurality of devices including the device itself; and manage the received information pertaining to the services offered by each of the other ones of the plurality of devices to accept a new device to join and cooperate with the plurality of devices in accordance with a context of the location. In embodiments, the operations may also include determining whether the new device is to replace the device as the master device and on determination that the new device is to be the master device, transfer control of a future receiving, advertising, detecting, and managing functions to the new device.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer- usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, at least one of processors 502 may be packaged together with memory having computational logic 522 (in lieu of storing on memory 504 and storage 506). For one embodiment, at least one of processors 502 may be packaged together with memory having computational logic 522 to form a System in Package (SiP). For one embodiment, at least one of processors 502 may be integrated on the same die with memory having computational logic 522. For one embodiment, at least one of processors 502 may be packaged together with memory having computational logic 522 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 is an apparatus for group management of a plurality of devices co-located with the apparatus at a location, comprising: a wireless transceiver; a processor coupled to the wireless transceiver; and a group management module operated by the processor to: control the wireless transceiver to receive information pertaining to services offered by the plurality of devices; transmit the received information pertaining to the services offered by the plurality of devices, and information pertaining to services offered by the apparatus; and detect a response to the transmission by a new device; and manage, as a master device, the received information pertaining to the services offered by the plurality of devices and the services offered by the apparatus to enable the new device to join and cooperate with the plurality of devices and the apparatus at the location.

Example 2 is the apparatus of Example 1, wherein the group management module is to determine how each of the plurality of devices can provide services in accordance with a context of the location.

Example 3 is the apparatus of Example 2, wherein the context of the location includes a light setting associated with the location.

Example 4 is the apparatus of any of Examples 1-3, wherein the group management module is to control the wireless transceiver to detect a response by a device new to the location or newly activated in the location.

Example 5 is the apparatus of Example 1, wherein the group management module is to use information related to a context of the location and the services offered by the plurality of devices to determine settings for each of the plurality of devices.

Example 6 is the apparatus of any one of Examples 1-5, wherein the group management module is to further identify whether the new device is to be a new master device, replacing the apparatus, based on a feasibility score of the apparatus and a feasibility score of the new device.

Example 7 is the apparatus of Example 6, wherein the feasibility scores are measured according to one or more characteristics including a type of power source, mobility, availability, device system specification, or number and type of network interfaces.

Example 8 is an apparatus, comprising: a wireless transceiver; a processor coupled to the wireless transceiver; and a group management module operated by the processor to compare characteristics of the apparatus to characteristics of a plurality of other apparatuses in a proximal location that includes the apparatus and the plurality of other apparatuses; and determine whether the apparatus is to serve as a master apparatus to communicate services provided by the apparatus and the plurality of other apparatuses, to the plurality of other apparatuses.

Example 9 is the apparatus of Example 8, wherein a comparison of characteristics of the apparatus to characteristics of the plurality of other apparatuses include a comparison of a feasibility score of the apparatus to feasibility scores of apparatuses in the plurality of other apparatuses.

Example 10 is the apparatus of Example 9, wherein the feasibility score of the master apparatus is a sum of weighted characteristics associated with the master apparatus and the feasibility scores of the apparatuses are individual sums of weighted characteristics associated with the apparatuses in the plurality of apparatuses.

Example 11 is the apparatus of Example 8, wherein the wireless transceiver includes a blue-tooth low energy transceiver.

Example 12 is the apparatus of any one of Examples 8-11, wherein the apparatus is one of a wearable consumer device, an appliance or fixture configured to provide light, a laptop, a tablet, a smartphone, a music player, and a television.

Example 13 is one or more computer-readable storage media (CRM) comprising instructions to cause a device, in response to execution of a processor of the device, to operate as a master device of a plurality of devices at a location, wherein to operate includes to: receive information pertaining to services offered by each of the other ones of the plurality of devices; advertise information pertaining to the services offered by each of the plurality of devices including the device itself; and manage the received information pertaining to the services offered by each of the other ones of the plurality of devices to accept a new device to join and cooperate with the plurality of devices in accordance with a context of the location.

Example 14 is the CRM of Example 13, wherein the new device is a new device to the location with the plurality of devices.

Example 15 is the CRM of Example 13, wherein to operate further comprises to detect a response to the advertising of the received information by the new device.

Example 16 is the CRM of Example 13, wherein to manage includes usage of the information related to a context of the location and the services offered by each of the plurality of devices to determine settings for each of the plurality of devices.

Example 17 is the CRM of any one of Examples 13-16, wherein to operate further comprises: to determine whether the new device is to replace the device as the master device; and on determination that the new device is to be the master device, transfer control of a future receive, advertise, detect, and manage function to the new device.

Example 18 is the CRM of Example 17, wherein to determine includes to compare a feasibility score of the master device with a feasibility score of the new device.

Example 19 is the CRM of Example 18, wherein to compare the feasibility scores includes to compare feasibility scores based upon a power source or mobility of the master device to a power source or mobility of the new device.

Example 20 is the CRM of Example 13, wherein to accept the new device to join and cooperate with the plurality of devices includes to provide configuration information to the new device.

Example 21 is a method to operate a device in a location with a plurality of devices, the method comprising: advertising, by the device, information pertaining to a service provided by the device; determining, by the device, whether the device is to be a master device among the plurality of devices; and on determining that the device is not the master device, deactivating, by the device, the advertising of the information pertaining to the service provided by the device, the advertising to be performed for device by the determined master device instead.

Example 22 is the method of Example 21, further comprising, configuring, by the device, itself to adapt to a context of the location based upon an instruction received from the master device.

Example 23 is the method of Example 22, wherein the configuring, by the device, of itself to adapt to the context of the location includes configuring, by the device, itself based upon properties defined in the context of the location with the plurality of devices.

Example 24 the method of Example 21, wherein determining includes comparing characteristics of the device to characteristics of each of other ones of the plurality of devices.

Example 25 is the method of Example 24, wherein comparing includes comparing one or more of power source, mobility, availability, and device system specification, or number and type of network interfaces.

Example 26 may be an apparatus for operating a device in a location with a plurality of devices, the apparatus comprising: means for advertising information pertaining to a service provided by the device; means for determining whether the device is to be a master device among the plurality of devices; and means for, on determining that the device is not the master device, deactivating the advertising of the information pertaining to the service provided by the device, the advertising to be performed for device by the determined master device instead.

Example 27 may example 26, further comprising means for configuring itself to adapt to a context of the location based upon an instruction received from the master device.

Example 28 may be example 27, wherein means for configuring includes means for configuring itself based upon properties defined in the context of the location with the plurality of devices.

Example 29 may be any one of examples 26-28, wherein means for determining includes means for comparing characteristics of the device to characteristics of each of other ones of the plurality of devices.

Example 30 may be example 29, wherein means for comparing includes means for comparing one or more of power source, mobility, availability, and device system specification, or number and type of network interfaces.

Although certain embodiments have been illustrated and described herein for purposes of description this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
a wireless transceiver;
a processor coupled to the wireless transceiver; and
a group management module operated by the processor to:
control the wireless transceiver to:
receive information pertaining to services offered by a plurality of devices co-located with the apparatus at a location;
transmit the received information pertaining to the services offered by the plurality of devices and information pertaining to services offered by the apparatus to each other of the devices in the plurality and to a new device joining the plurality and the apparatus at the location, wherein the services include at least a first type of service and a second type of service, the first type of service different from the second type of service;
detect a response to the transmission by the new device; and
transmit new settings of the first and second types of service to the plurality and the new device;
wherein the group management module is to further generate weights corresponding to characteristics of each of the plurality and the new device based on a relevance of the characteristics to a context of the location and wherein the new settings are determined based at least in part on the weights and transmitted by the group management module to a first device and a second device of the plurality to direct the first device and the second device to self-adapt a level of the respective first type of service and second type of service to the context of the location.

2. The apparatus of claim 1, wherein the group management module is to determine how each of the plurality of devices can provide services in accordance with the context of the location.

3. The apparatus of claim 2, wherein the context of the location includes a light setting associated with the location.

4. The apparatus of claim 1, wherein the new device is new to the location or newly activated in the location.

5. The apparatus of claim 1, wherein the group management module is to use information related to the context of the location and the services offered by the plurality of devices to determine the new settings.

6. The apparatus of claim 1, wherein the group management module is to further identify whether the new device is to be a new master device, replacing the apparatus, based on a feasibility score of the apparatus and a feasibility score of the new device.

7. The apparatus of claim 6, wherein the feasibility scores are measured according to one or more characteristics including a type of power source, mobility, availability, device system specification, or number and type of network interfaces.

8. An apparatus, comprising:
a wireless transceiver;
a processor coupled to the wireless transceiver; and
a group management module operated by the processor to:
compare characteristics of the apparatus to characteristics of a plurality of other apparatuses in a proximal location that includes the apparatus and the plurality of other apparatuses; and
determine whether the apparatus is to serve as a master apparatus to communicate services provided by the apparatus and the plurality of other apparatuses to each of the plurality of other apparatuses and wherein the services include at least a first type of service and a second type of service, the first type of service different from the second type of service, wherein when the apparatus is to serve as the master apparatus, the group management module is to further determine new settings of the first and second types of services, in view of a new device joining the proximal location and a context of the proximal location;
and
wherein a device at the proximal location offering the first or second type of service self-adapts to a corresponding new setting, and the corresponding new setting based at least in part on weights generated by the group management module and corresponding to the characteristics of the plurality of other apparatuses based on a relevance of the characteristics to the context of the proximal location and transmitted to each of the plurality of other apparatuses to direct the apparatuses to self-adapt a level of the respective first type of service or second type of service to the context of the proximal location.

9. The apparatus of claim 8, wherein a comparison of characteristics of the apparatus to characteristics of the plurality of other apparatuses include a comparison of a feasibility score of the apparatus to feasibility scores of apparatuses in the plurality of other apparatuses.

10. The apparatus of claim 9, wherein the feasibility score of the master apparatus is a sum of weighted characteristics associated with the master apparatus and the feasibility scores of the apparatuses are individual sums of weighted characteristics associated with the apparatuses in the plurality of apparatuses.

11. The apparatus of claim 8, wherein the wireless transceiver includes a blue-tooth low energy transceiver.

12. The apparatus of claim 8, wherein the apparatus is one of a wearable consumer device, an appliance or fixture configured to provide light, a laptop, a tablet, a smartphone, a music player, and a television.

13. One or more non-transitory computer-readable storage media (CRM) comprising instructions to cause a device, in response to execution of a processor of the device, to operate as a master device of a plurality of devices at a location, wherein to operate as the master device includes to:
receive information pertaining to services offered by each of the other ones of the plurality of devices;
advertise, to each of the plurality of devices, information pertaining to the services offered by each of the other ones of the plurality of devices including the device itself, wherein the services include at least a first type and a second type of service that are different from each other;
generate weights corresponding to characteristics of each of the other ones of the plurality of devices including the device itself, wherein the weights are based on a relevance of the characteristics to a context of the location; and
determine new settings of the first and second types of services, in view of a new device joining the location, the context of the location and based at least in part on the generated weights;
wherein a device at the location offering the first or second type of service self-adapts to the corresponding new setting.

14. The CRM of claim 13, wherein the new device is a new device to the location with the plurality of devices.

15. The CRM of claim 13, wherein to operate further comprises to detect a response to the advertising of the received information by the new device.

16. The CRM of claim 13, wherein to determine includes usage of the information related to the context of the location and the services offered by each of the plurality of devices.

17. The CRM of claim 13, wherein to operate further comprises:
to determine whether the new device is to replace the device as the master device; and
on determination that the new device is to be the master device, transfer control of a future receive, advertise, detect, and determine to the new device.

18. The CRM of claim 17, wherein to determine includes to compare a feasibility score of the master device with a feasibility score of the new device.

19. The CRM of claim 18, wherein to compare the feasibility scores includes to compare feasibility scores based upon a power source or mobility of the master device to a power source or mobility of the new device.

20. The CRM of claim 13, wherein to accept the new device to join and cooperate with the plurality of devices includes to provide configuration information to the new device.

21. A method to operate a device in a location with a plurality of devices, the method comprising:
advertising, by the device, information pertaining to a service provided by the device;
determining, by the device, whether the device is to be a master device among the plurality of devices;

on determining that the device is not the master device, deactivating, by the device, the advertising of the information pertaining to the service provided by the device, the advertising to be performed for the device by the determined master device instead;

receiving from the determined master device, information pertaining to a plurality of services provided by each of the other devices in the plurality, wherein the services include at least a first type and a second type of service, the first type of service different from the second type of service;

receiving, from the determined master device, a corresponding new setting for at least the first type or the second type of service, wherein the corresponding new setting is based on weights corresponding to characteristics of each of the other devices in the plurality and including the device itself and is based on a relevance of the characteristics to a context of the location, and self-adapting, by the device, to the corresponding new setting.

22. The method of claim 21, further comprising configuring, by the device, itself to self-adapt to the corresponding new setting of the first or second type of service, based upon an instruction received from the master device.

23. The method of claim 22, wherein the configuring, by the device, of itself to self-adapt to the corresponding new setting of the first or second type of service includes configuring, by the device, itself based upon properties defined in the context of the location.

24. The method of claim 21, wherein determining includes comparing characteristics of the device to characteristics of each of other ones of the plurality of devices.

25. The method of claim 24, wherein comparing includes comparing one or more of power source, mobility, availability, and device system specification, or number and type of network interfaces.

* * * * *